(12) United States Patent
Bojie et al.

(10) Patent No.: US 11,751,718 B2
(45) Date of Patent: Sep. 12, 2023

(54) HYDRAULIC SIPHON ASSISTED BREWING APPARATUS WITH AGITATION MECHANISM

(71) Applicants: Andrew Bojie, Bentonville, AR (US); Todd Jones, Joplin, MO (US); Larry Robertson, Bella Vista, AR (US)

(72) Inventors: Andrew Bojie, Bentonville, AR (US); Todd Jones, Joplin, MO (US); Larry Robertson, Bella Vista, AR (US)

(*) Notice: Subject to any disclaimer, the term of this patent is extended or adjusted under 35 U.S.C. 154(b) by 356 days.

(21) Appl. No.: 16/991,130

(22) Filed: Aug. 12, 2020

(65) Prior Publication Data

US 2021/0052105 A1    Feb. 25, 2021

Related U.S. Application Data

(60) Provisional application No. 62/889,110, filed on Aug. 20, 2019.

(51) Int. Cl.
| | | |
|---|---|---|
| *A47J 31/06* | (2006.01) | |
| *A47J 31/46* | (2006.01) | |
| *A47J 31/44* | (2006.01) | |
| *A47J 31/52* | (2006.01) | |
| *A47J 31/18* | (2006.01) | |
| *A47J 31/02* | (2006.01) | |

(52) U.S. Cl.
CPC ......... *A47J 31/469* (2018.08); *A47J 31/0605* (2013.01); *A47J 31/0615* (2013.01); *A47J 31/18* (2013.01); *A47J 31/446* (2013.01); *A47J 31/525* (2018.08); *A47J 31/02* (2013.01)

(58) Field of Classification Search
CPC .... A47J 31/02; A47J 31/0605; A47J 31/0615; A47J 31/0663
USPC .......................................... 99/287, 299, 306
See application file for complete search history.

(56) References Cited

U.S. PATENT DOCUMENTS

| | | | | |
|---|---|---|---|---|
| 4,771,680 | A * | 9/1988 | Snowball ............ | A47J 31/0615 99/295 |
| 4,779,520 | A * | 10/1988 | Hauslein ............. | A47J 31/0631 99/287 |
| 4,983,412 | A * | 1/1991 | Hauslein ............. | A47J 31/0631 426/433 |
| 5,992,299 | A * | 11/1999 | Fong ....................... | A47J 31/42 99/290 |
| 7,717,026 | B1 * | 5/2010 | Lassota ................... | A47J 31/56 99/305 |
| 2009/0317526 | A1 * | 12/2009 | Tacklind ............. | A47J 31/0615 426/433 |
| 2019/0090503 | A1 * | 3/2019 | Anthony ................. | A47J 31/52 |
| 2020/0008611 | A1 * | 1/2020 | Sjaastad ................ | B01F 35/222 |

* cited by examiner

*Primary Examiner* — Reginald Alexander

(57) ABSTRACT

A beverage brewing system having, inter alia, a brew hopper, a hydraulic siphoning component affixed thereto and a solenoid-actuated door switch mechanism. The beverage brewing system includes a hydraulic siphoning component configured to allow hot water to bloom and steep for a controlled amount of time in a brew hopper. The beverage brewing system further includes a brew-hopper agitation mechanism.

5 Claims, 6 Drawing Sheets

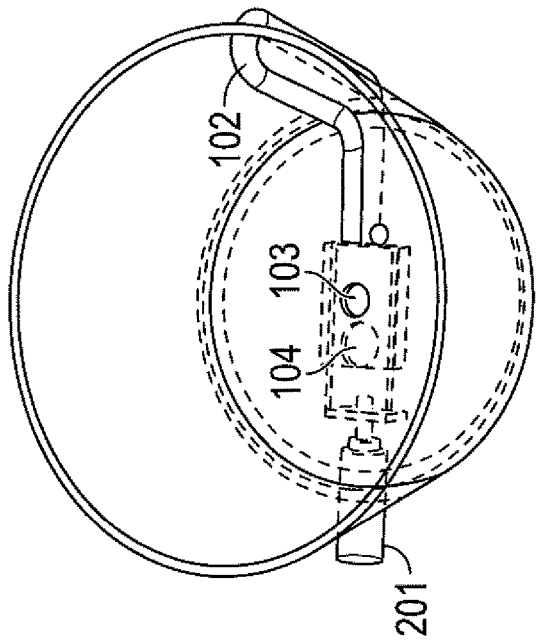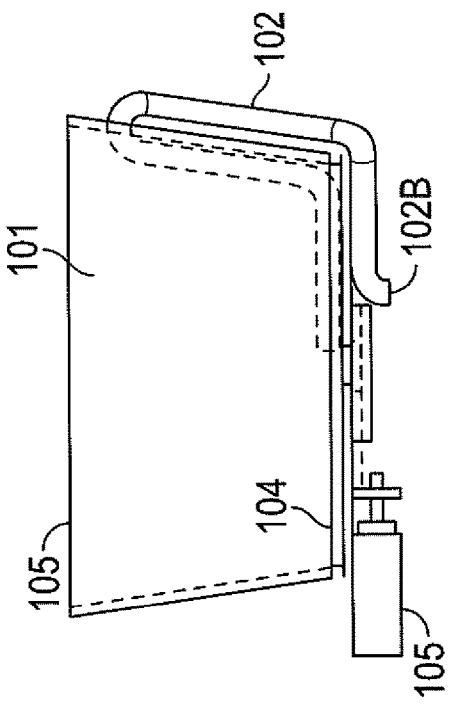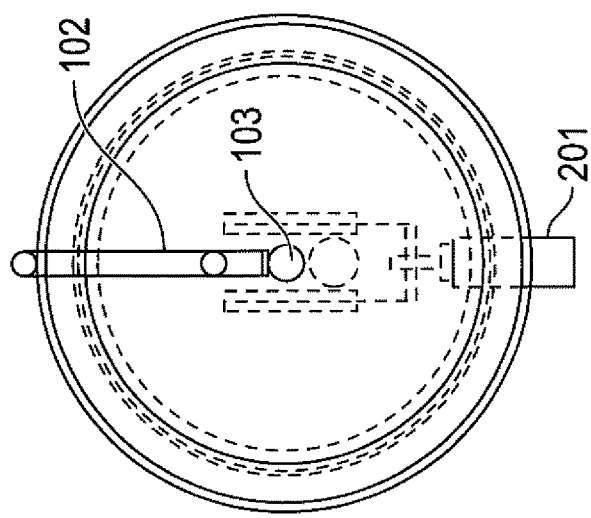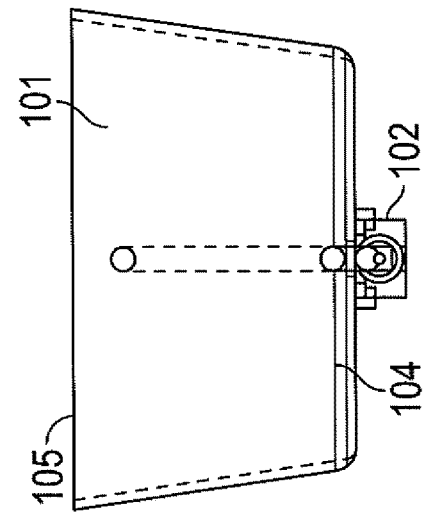

HYDRAULIC SIPHON ASSISTED BREWING APPARATUS WITH AGITATION MECHANISM

CROSS REFERENCE TO RELATED APPLICATIONS

This application claims the benefit of U.S. Provisional Application No. 62/889,110 filed on Aug. 20, 2019, entitled "HYDRAULIC SIPHON ASSISTED BREWING APPARATUS AND METHOD" and U.S. Provisional Application No. 62/296,383 filed on Jan. 20, 2020, entitled "COFFEE BREWER AGITATOR AND METHOD".

TECHNICAL FIELD

The present invention relates to apparatus and systems designed to brew hot beverages, such as coffee and tea.

BACKGROUND

A disadvantage of auto-drip coffee makers is that they do not wet all the grounds in the brew hopper when it brews a beverage such as coffee. The coffee grounds directly under the spout get most of the hot water and the rest of the coffee grounds get moist indirectly via steam. This type of apparatus produces a weak cup of coffee and wastes the grounds outside of the drip spout.

It is possible to purchase a cup of coffee with a rich, bold flavor at nationally recognized coffee shops, but these well-brewed cups of coffee are expensive. There are known brew methods which produce excellent cups of coffee but all of them take a significant amount of time, effort and precision and are also expensive.

A further disadvantage of traditional auto-drip coffee makers is that they do not wet all the grounds in the brew hopper due to limited contact of hot water with the grounds. There are methods that partially solve this problem by submerging the grounds and allowing them to steep prior to releasing into a carafe, but fail to maximize the wetted surface area, which can be accomplished by an additional step of stirring or agitating the submerged grounds. Maximizing the wetted surface area of the grounds in this manner results in fewer wasted grounds and a more flavorful coffee.

SUMMARY

The invention provides a bold, dynamic, full-bodied cup of coffee with the brewing speed and convenience of an auto-drip coffee maker. The invention allows users to enjoy an expertly brewed pot of coffee, steeped at the optimal time and temperature, while providing a simple alternative to other laborious and time-consuming methods of brewing. By employing hydraulic technology, the invention's siphoning system pre-infuses the coffee grounds to begin the steeping process. The invention thus enables the coffee grounds to release optimum flavor which results in the perfectly brewed cup of coffee.

The invention's hydraulic siphoning components are configured to allow hot water to bloom and steep for a controlled amount of time based on the inlet rate of hot water from auto-drip spout. When the cold water chamber of the auto-drip machine is empty and thermal switch to the heating element cuts the power, a solenoid opens the drain door at the bottom of the brew hopper to allow the remaining steeped coffee in the brew hopper to be dispensed into the auto-drip carafe.

A further embodiment of the invention includes an agitation mechanism that improves the intensity of flavor of brewed coffee by increasing the effective wetted surface area of steeping coffee grounds. The siphoning system infuses the coffee grounds before or during the steeping process. The invention then agitates the submerged grounds to maximize flavor infusion. Such agitation can be continuous during steeping or discontinuous with intermittent starting and stopping during steeping and such agitation can start before or during infusion or can begin and then stop after infusion.

Siphoning components are configured to allow hot water to bloom and steep for a controlled amount of time based on inlet rate of hot water from auto-drip spout. In an embodiment, while the cold water chamber of the auto-drip machine is being emptied into the brew hopper, the mixture can be continuously or discontinuously agitated via vibration or stirring, after which a solenoid opens (immediately or after a delay) the drain door at the bottom of the brew hopper opens to allow the steeped coffee in the brew hopper to be dispensed into the auto-drip carafe. In a further embodiment, when the cold water chamber of the auto-drip machine is at a predetermined level, the mixture is agitated via vibration or stirring, after which a solenoid opens, immediately or after a delay, the drain door at the bottom of the brew hopper to allow the steeped coffee in the brew hopper to be dispensed into the auto-drip carafe.

The invention provides a bold, dynamic, full-bodied cup of coffee with the flavor provided by a Chemex™ or French Press, but with the convenience of an auto-drip coffee brewer.

BRIEF DESCRIPTION OF THE DRAWINGS

For a better understanding of the present invention including the features, advantages and specific embodiments, reference is made to the following detailed description along with accompanying Figures, wherein:

FIG. 3 is a top view of the brew hopper and hydraulic siphon tube assembly;

FIG. 4 is another perspective view of the brew hopper and hydraulic siphon tube assembly;

FIG. 5 is a front view of the brew hopper and hydraulic siphon tube assembly;

FIG. 6 is a side view of the brew hopper and hydraulic siphon tube assembly;

DETAILED DESCRIPTION

Figure 1:
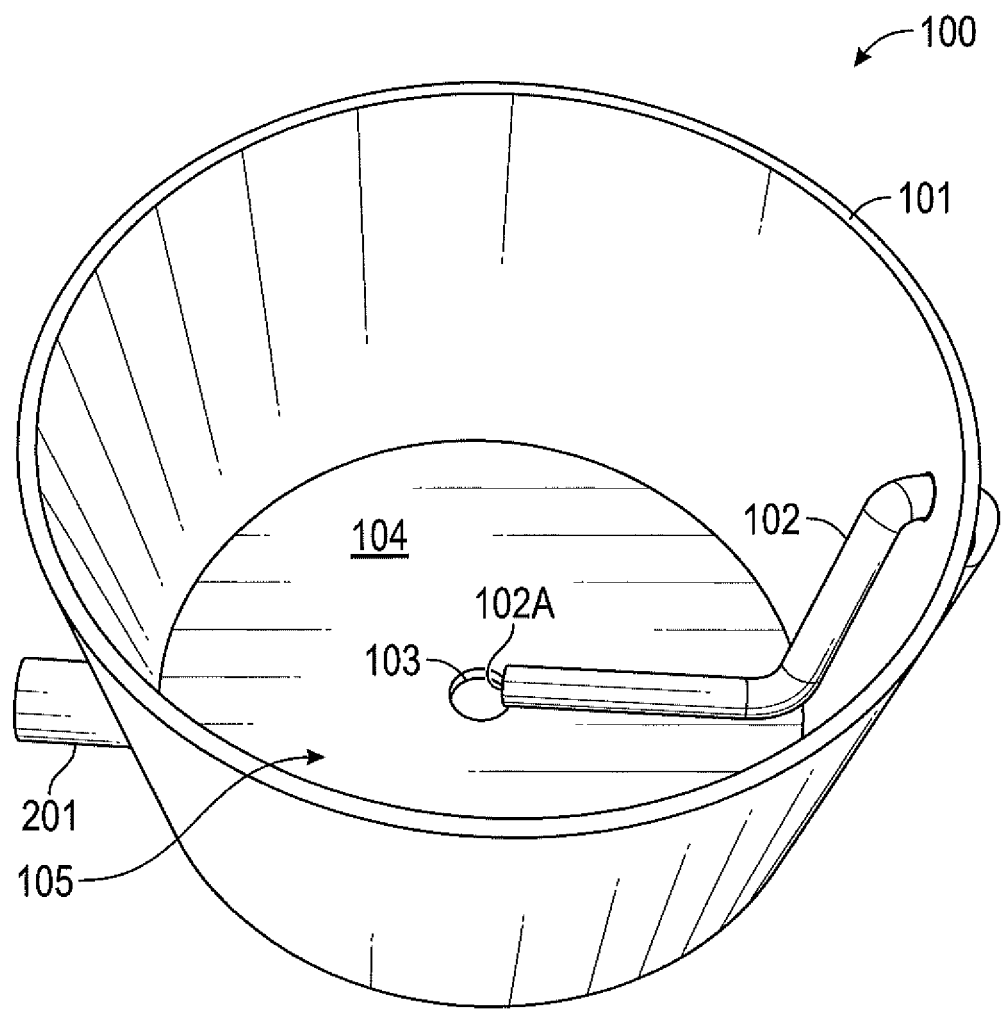
FIG. 1 is a perspective view of the brew hopper and hydraulic siphon tube assembly.

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

The invention improves on a conventional auto-drip coffee maker by adding a hydraulic siphoning component and solenoid actuated door assembly, said components configured to allow hot water to bloom and steep for a controlled amount of time in a brew hopper based on inlet rate of hot water from auto-drip spout. In a further embodiment, an agitation assembly is coupled to the brew hopper to assist in wetting of the grounds. Another embodiment uses an electric recirculation pump to pump the brewed liquid from the carafe back into the filter basket for extended steeping. When a cold-water chamber of an auto-drip coffeemaker is sensed by a sensor to be empty, a thermal switch to the heating element cuts off the power to the heating element, a solenoid opens the drain door at the bottom of the brew hopper and turns off the recirculation pump to allow the remaining steeped coffee in the brew hopper to be dispensed into the auto-drip carafe.

A further aspect of the invention is a spring supported brew hopper or basket of a conventional auto-drip coffee machine. The invention uses the dimensions of standard auto-drip hopper, filter and carafe. This invention however further includes components to hydraulically siphon the steeped coffee from the brew hopper and release and drain the remaining steeped coffee when the brew process has ended. The invention involves a siphoning process. While many coffee producing options exist that teach steeping grounds for the optimal four minutes, the invention provides the same result with hydraulic siphon technology. The invention's hydraulic siphon tube assembly, electric recirculation pump, mechanically actuated door assembly and solenoid actuator function together to brew coffee with minimal effort.

The invention automatically "blooms" the coffee by pre-infusing the grounds with water, a crucial step to remove carbon-dioxide left over from the grinding process. Skipping this step will allow the carbon-dioxide to repel water during the brewing process, effectively making the brew weaker. The invention's siphon tube level can be calibrated with an auto drip system to ensure coffee is steeped for a recommended time that provides best flavor, typically about four (4) minutes. The process automatically produces a full-bodied cup of coffee, similar to that produced by a French-press coffee maker process without the undesirable sedimentation or health concerns. The siphoning method uses a basket filter allowing the user to choose finely ground beans, which extracts more flavor without bitterness. The invention is substantially automatic, hence there is no need to monitor or manually manipulate any step in the process unlike the French press, Aeropress, Pour-over, Chemex™ or vacuum/siphon brewing systems.

The invention produces results similar to the Chemex™ system. However, the invention has the following additional advantages not found in the Chemex™ system: the grind level (course to fine) does not have to be precisely controlled to adjust steeping time and no special filter required. Further, with the invention, one does not have to manually heat and pour water over grounds to bloom or brew. The invention also produces results similar to a French press. However, the invention has the following advantages not found in the French press: the use of a filter does not leave sediment or grounds in the cup and because the invention uses a finer filter, harmful cholesterol is filtered out. Further, with the invention, the operator is not required to heat water in a separate kettle to manually pour over grounds nor is one required to manually time the steep process and pour the brewed liquid into a separate container to avoid oversteeping. Further, the invention has the advantages over the pour-over process. The operator is not required to heat water in a separate kettle to manually pour over grounds to pre-infuse and bloom nor manually control the time of the steep process. Notably, the invention is not a vacuum process which requires water to boil in lower chamber at 212° F., which causes bitter coffee due to the high water temperature. Rather, the invention has the advantage that once water, filter and coffee grounds have been placed in brew machine, the entire automatic brew process completes automatically once activated. The invention has advantages over the auto drip systems. Specifically, steeping time is calibrated and controlled to brew an optimally flavored cup of coffee and the invention blooms the coffee. The invention is an apparatus for brewing a beverage, comprising an auto-drip coffee maker having therein, inter alia, a hydraulic siphoning and a solenoid-actuated switch mechanism. The invention is further disclosed as a coffee brewing system, comprising a hydraulic siphoning component attached to a brew hopper and configured to allow hot water to fill the brew hopper to a certain level so as to bloom and steep the coffee or tea therein for a controlled amount of time based on inlet rate of hot water from an auto-drip spout. When a sensor to a cold-water chamber of the auto-drip machine senses the chamber is empty, a thermal switch to a heating element cuts off the power to the heating element and a solenoid opens a drain door at the bottom of the brew hopper so as to allow the remaining steeped coffee in the brew hopper to be dispensed into a carafe.

The invention is a beverage brewing apparatus having a hydraulic siphoning assembly attached to a brew hopper and thermal switch coupled to a heating element operable to cut off the power to the heating element when a cold-water chamber is sensed to be empty using a cold water chamber sensor, and a solenoid actuator is operable to open a drain door at the bottom of the brew hopper so as to allow the remaining steeped coffee in the brew hopper to be dispensed into a carafe.

The beverage brewing apparatus includes an inlet to a tube assembly positioned at a lowest point of a brew hopper and beneath a standard auto-drip filter whereby hot water drips into the brew hopper, filling it and the tube assembly at the same rate and a door assembly operable to prevent water from draining from the hopper, thus allowing for blooming and additional steep time of the coffee. After the water level reaches the highest point of the tube assembly, siphoning commences. The tube inlet is operable to pull water in and the siphoning action is operable to cause the water to flow through the tube assembly to the tube outlet into the carafe. Siphoning action continues until the water level falls below the inlet tube. The siphoning process repeats until the water level in the brew hopper no longer reaches the highest point of the tube assembly. A door assembly is operable to actuate to an open position by a solenoid which is wired to the existing thermal switch, thus draining the remaining brewed coffee.

Reference will now be made in detail to the preferred embodiments of the invention. The drawings, diagrams and descriptions assume sizes, controls, mechanisms or processes are the similar to a conventional auto-drip coffee brewing machine.

FIG. 1 is a perspective view of a brew hopper 100 having a cylindrical wall 101 and substantially closed brew hopper bottom 104 and open brew hopper top 105. Drain aperture 103 is located at a point equidistant from the edge of the closed brew hopper bottom 104. Hydraulic siphon tube assembly 102 is a cylindrical tubing with a first open end 102A (inlet) inside the brew hopper 100 and a second open end 102B (outlet) (seen in FIG. 2) outside the brew hopper 100. Hydraulic siphon tube assembly 102 traverses through an aperture in the cylindrical wall 101 of the brew hopper 100 proximate the top of open brew hopper top 105. The hydraulic siphon tube assembly operates as a steeping lift system. A solenoid actuator 201 is operable to actuate a door as seen in FIG. 2.

Figure 2:
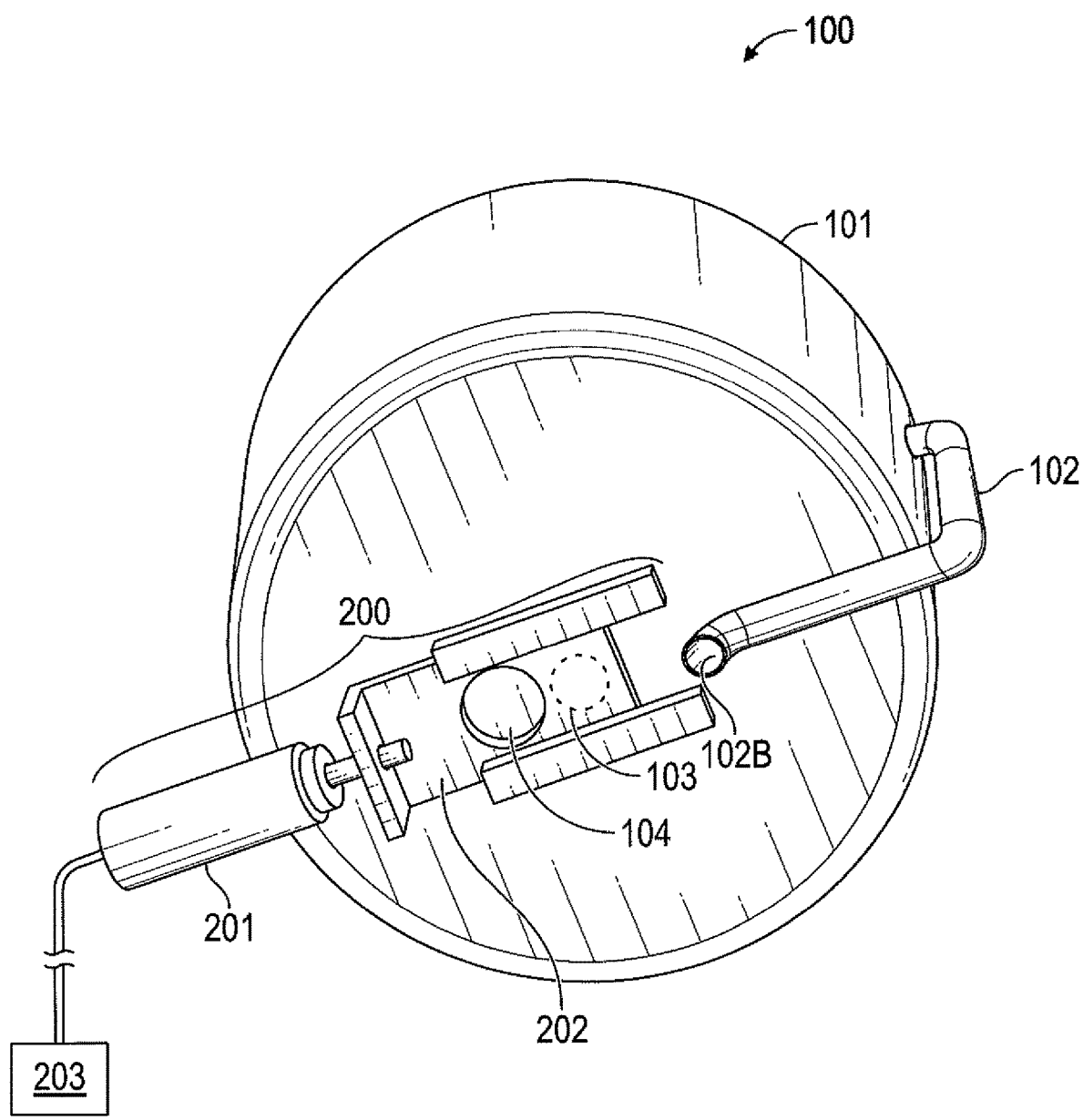
FIG. 2 is a perspective view of the underside of a brew hopper including a portion of the hydraulic siphon tube assembly and drain aperture door actuator.

FIG. 2 is a perspective view of the underside of a brew hopper 100 and a portion of the hydraulic siphon tube assembly 102. FIG. 2 further shows the solenoid actuated drain aperture door assembly 200 comprised of the drain aperture door 202 and the solenoid actuator 201. In an embodiment, a delay timer can be coupled to the solenoid actuator to delay the opening of the door thus allowing liquid to drain from drain aperture 103. Thermal switch 203 is also operable to turn off the heating element when the coffee machine's reservoir is empty. By connecting the wired leads of the solenoid actuator 201 to thermal switch 203, the solenoid actuator 203 actuates causing the drain aperture door 202 to open.

FIG. 3 is a top view of the brew hopper 100, a portion hydraulic siphon tube assembly 102 and solenoid actuator 201. FIG. 4 is a side view of the brew hopper 100, hydraulic siphon tube assembly 102, solenoid actuator 201 and drain aperture door 202. Solenoid actuator 201 is preferably wired to a thermal switch 203 as used in an auto-drip coffee machine.

Reference is made to FIGS. 1-6 in describing the operation of the invention. In operation, the first open end 102A (inlet) inside the brew hopper 100 is positioned at lowest point of the brew hopper 100 and is positioned beneath a standard auto-drip filter. A coffee filter and ground coffee are placed in the brew hopper 100. Hot water drips into the brew hopper 100, filling it and siphon tube assembly 102 at the same rate. The solenoid actuated drain aperture door assembly 200 is in a closed position over the drain aperture 103 to prevent water from draining from brew hopper 100, thus allowing for blooming and additional steep time. After approximately four minutes of steeping, the water level reaches the highest point of the hydraulic siphon tube assembly 102. Siphoning begins at this point. The first open end 102A (inlet) inside the brew hopper 100 pulls water in and the siphoning action causes the water to flow through the hydraulic siphon tube assembly 102 to the second open end 102B (outlet) outside the brew hopper 100 where it flows into a carafe (not shown). The siphoning action continues until the water level falls below the first open end 102A (inlet). This siphoning process continues until the water level in the brew hopper 100 no longer reaches the highest point of the hydraulic siphon tube assembly 102. To drain the remaining fluid in brew hopper 100, solenoid actuator 201 is actuated to retract drain aperture door 202, thus allowing fluid to flow through drain aperture 103 into a carafe. Solenoid actuator 201 is preferably wired to a thermal switch 203 as used in an auto-drip coffee machine. Thermal switch 203 is also operable to turn off the heating element when the coffee machine's reservoir is empty. By connecting the wired leads of the solenoid actuator 201 to thermal switch 203, the solenoid actuator 203 actuates causing the drain aperture door 202 to open. Once open, the remaining fluid (e.g., coffee infused water) in brew hopper 100 drains into the carafe until the brew hopper 100 is substantially empty.

Additional features and characteristics of the invention include the flowing: As noted, the hydraulic siphon tube assembly 102 passes through an aperture in the cylindrical side wall 101 of brew hopper 100. The seam between the hydraulic siphon tube assembly 102 and the aperture is sealed to prevent leakage. The maximum height reached by the hydraulic siphon tube assembly 102 when traversing the aperture through the cylindrical side wall 101 of brew hopper 100 compared to the height of either of the first open end 102A (inlet) or second open end 102B (outlet) controls the steeping time, which is approximately 4 min. +/−15 seconds for a typical arrangement of the hydraulic siphon tube assembly 102.

The solenoid actuator 201 is coupled or fused to the body of the brew machine or brew hopper and wired to the existing auto drip coffee brewer thermal switch 203 which in turn is coupled to an energy source such as a power supply. Depending on the form factor of the brew machine, the solenoid actuator 201 is not necessarily attached to the brew hopper. An auto-drip thermal switch 203 is coupled to an energy source and is operable to cut power to the water heating elements when the cold water chamber is empty. The solenoid actuator 201 can also be wired to actuate upon this loss of power to the brew machine so as to open the drain aperture door 202.

In a further embodiment, the solenoid actuated drain aperture door assembly 200 is spring actuated to maintain one position (open or closed) when not energized.

Further embodiments of the invention include but are not limited to the hydraulic siphon tube assembly 102 comprising an adjustable tube to control the steep times for different teas and coffee. In such an embodiment, a first portion near the inlet of the hydraulic siphon tube assembly 102 is comprised of a flexible material or structure, similar to a bendable straw. Further, the cylindrical wall 101 of the brew hopper 100 can be configured to telescope so as to be moveable up or down to calibrate the steep time to match ideal for the coffee or tea type.

Figure 7:
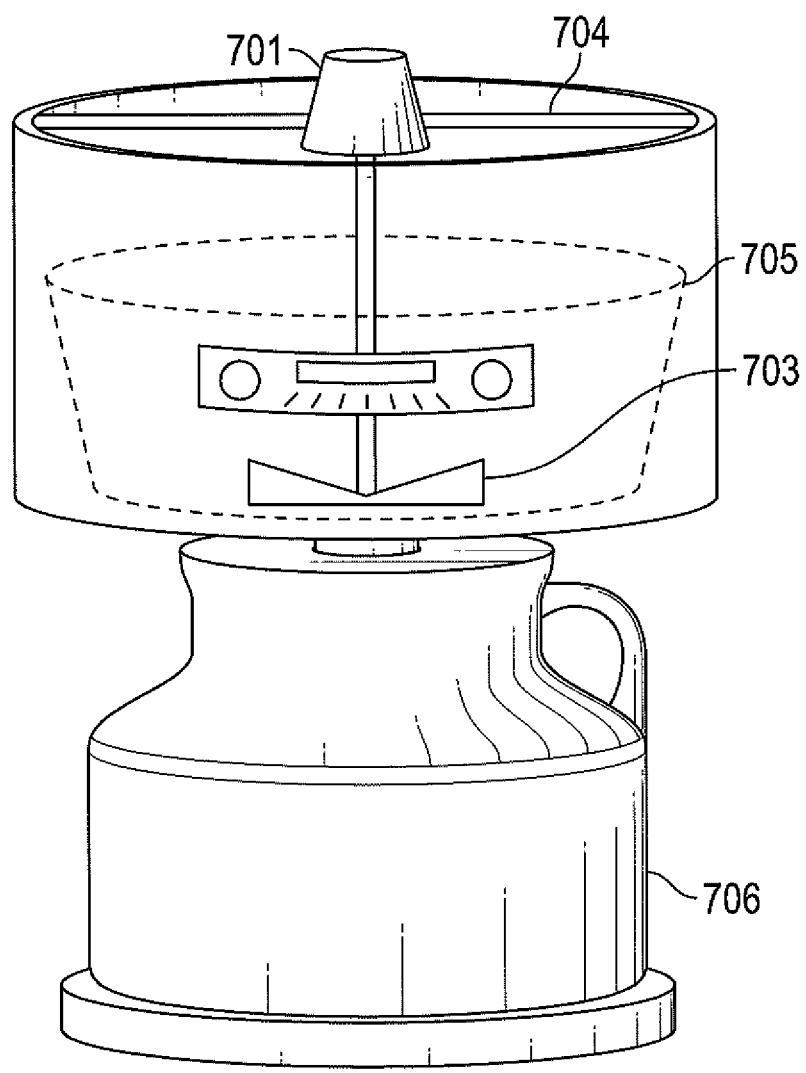
FIG. 7 is a side view of the brew hopper and agitation assembly.
Figure 8:
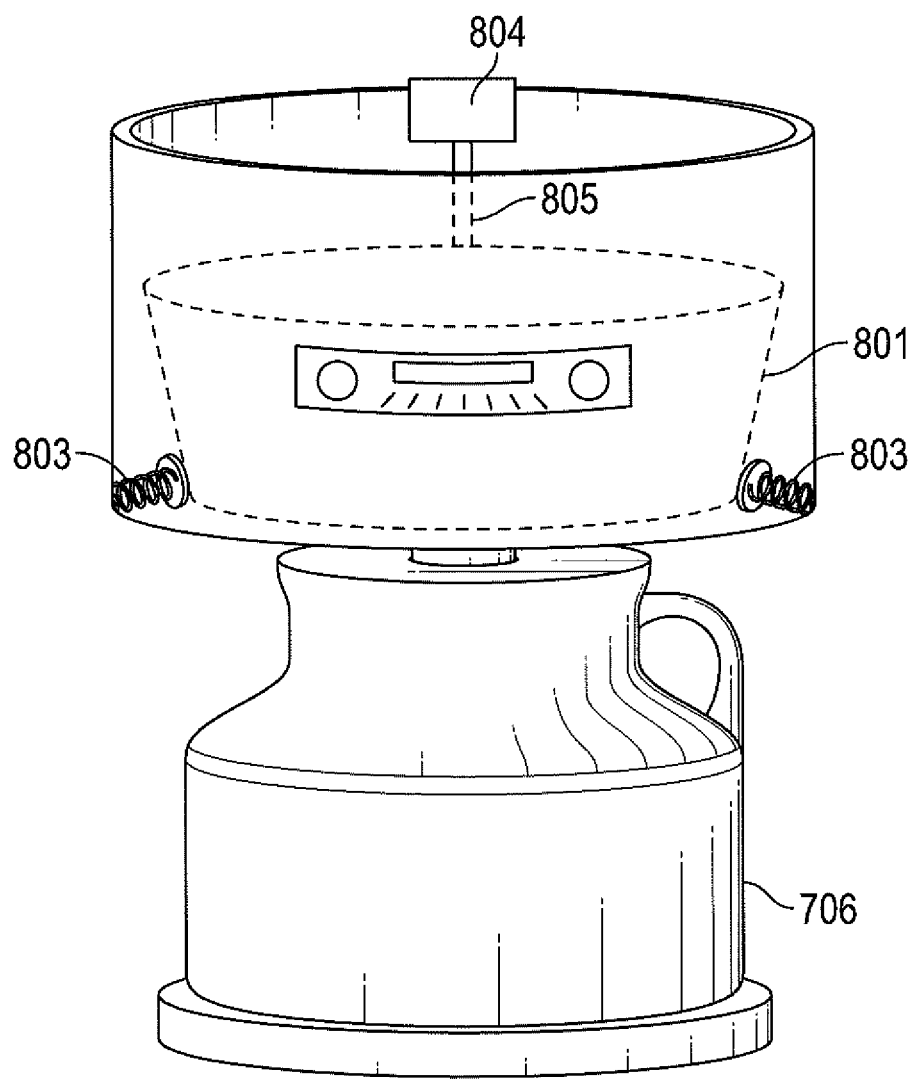
FIG. 8 is a front view of an auto drip brewer and carafe having a vibration or shaker mechanism with a spring supported hopper to assist in agitation.

Referring now to FIGS. 7 and 8, the invention further includes an agitation assembly for agitating the coffee-ground and water mixture in the brew hopper 101. FIG. 7 is a side view of the brew hopper and carafe with the agitation assembly (701-704). FIG. 8 is a side view of a portion of an auto drip brewer carafe having a spring supported hopper to assist in agitation. The agitation assembly comprises components configured to vibrate or shake the filter basket or to mechanically stir the mixture in the filter basket. The agitation assembly can be activated to occur prior, during or after the coffee grounds are submerged in hot water and before the steeped coffee is drained by opening the opening a drain aperture door.

Referring now to FIG. 7, the components of an agitation assembly include agitation motor 701 which can be a cylindrical vibrator motor, vibration motor, micromotor, or low geared motor that is coupled via shaft 702 to paddles 703. Paddles 703 are operable to agitate or stir the grounds in brew hopper 705. Horizontal support 704 comprise beams supporting the agitation motor 701 above the brew hopper 705.

FIG. 8 shows components of a further embodiment of the invention for agitating the grounds in a filter basket. As seen therein, filter basket 801 is supported on support springs 803. Agitation motor 804 is coupled via rod 805 to filter basket 801. Agitation motor 804 can be a cylindrical vibrator motor or vibration motor. In operation, agitation motor 804, when energized, is operable to shake filter basket 801 thus causing water contained therein to more fully soak the coffee grounds.

As seen in FIGS. 7 and 8, the invention improves the exchange of flavor between coffee grounds and water by one of several methods, these including vibration or shaking of the filter basket/brew hopper or mechanically stirring the contents of the filter basket/brew hopper. An embodiment of the invention mounts the filter basket or brew hopper on spring mounts or supports or otherwise allowing limited freedom of movement of the filter basket or brew hopper during the brewing process without compromising the inlet and outlet connections and seals. The agitation motor is coupled via a rod or other rigid connecting mechanism to the filter basket or brew hopper to agitate the filter basket or brew hopper and its contents via vibration. The agitation motor is comprised of electrical vibrating components generally comprising a rapidly spinning motor coupled to an asymmetric weighted component, the rapid unbalanced oscillation of said asymmetric component resulting in multi-directional accelerations which change on short time scales. Vibrating the filter basket or brew hopper during the brewing process minimizes the amount of grounds adhering to the sides of the basket/hopper during drain cycles. The siphoning system aspect of the invention infuses the coffee grounds before or during the steeping process. The invention agitates the submerged grounds to maximize flavor infusion. Such agitation can be continuous during steeping or discontinuous with intermittent starting and stopping during steeping and such agitation can start before or during infusion or can begin and then stop after infusion.

Figure 9:
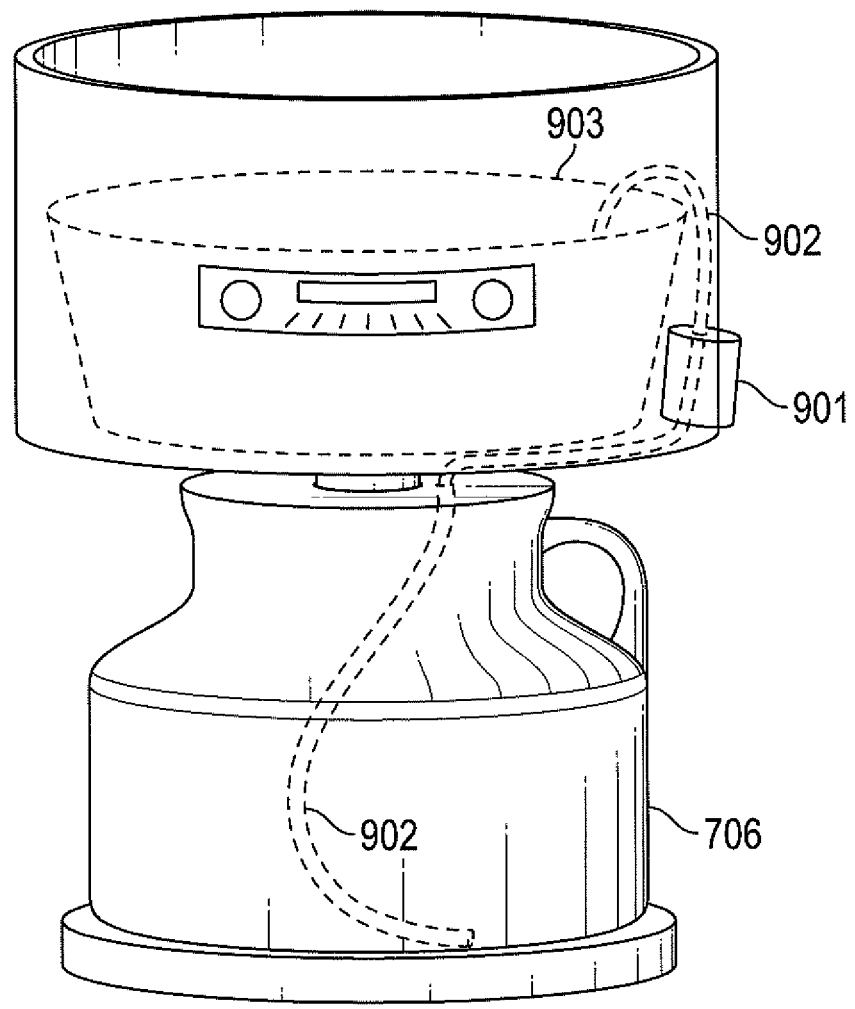
FIG. 9 is a front view of an auto drip brewer and carafe having an additional embodiment of an electric recirculation pump to extend the steeping process and enhance the agitation mechanism.

FIG. 9 is a front view of an auto drip brewer and carafe having an additional embodiment of an electric recirculation pump to extend the steeping process and enhance the agitation mechanism. The recirculation pump is deactivated at the end of the steeping cycle when the hopper solenoid opens the slide to drain the filter basket into the carafe. As seen in FIG. 9, recirculation tube 902, recirculation pump 901 siphon tube 902, filter basket 903 are operable to pump brewed beverage out of the carafe, back into the filter basket to extend the steeping time and process siphoning infused liquid from filter basket 903 before draining back into carafe 706.

The invention includes an electrical motor being coupled to a stirring component such as a paddle, said stirring component being placed so that it extends into and is submerged within the contents of the filter basket or brew hopper such that when actuated it agitates said contents via stirring in order to increase the wetted surface area of the grounds.

The embodiments shown and described above are only exemplary. Even though numerous characteristics and advantages of the present invention have been set forth in the foregoing description together with details of the connectors of the present invention, the disclosure is illustrative only and changes may be made within the principles of the invention to the full extent indicated by the broad general meaning of the terms used herein. Various alterations, modifications and substitutions can be made to the disclosed invention without departing in any way from the spirit and scope of the invention.

What is claimed is:

1. An apparatus for brewing a beverage, comprising:
   a brew hopper having a cylindrical wall, a substantially closed brew hopper bottom and an open brew hopper top configured to receive a filter;
   a drain aperture located at a point centered equidistant from the edge of the closed brew hopper bottom; and
   a hydraulic siphon tube assembly coupled to the brew hopper, wherein the hydraulic siphon further comprises a cylindrical tubing with a first open end (inlet) inside the brew hopper and a second open end (outlet) outside the brew hopper and wherein the hydraulic siphon tube assembly traverses through an aperture in the cylindrical wall of the brew hopper proximate the top of open brew hopper top.

2. The apparatus for brewing a beverage of claim 1, further comprising:
   a solenoid actuator mechanically coupled to the brew hopper; and
   a drain aperture door coupled to the solenoid actuator.

3. The apparatus for brewing a beverage of claim 2, wherein the solenoid actuator is coupled to a thermal switch and is operable to open the solenoid actuated drain aperture door when the thermal switch connects an energy source to the solenoid actuator.

4. A beverage brewing system, comprising:
   a brew hopper having a cylindrical wall, a substantially closed brew hopper bottom and an open brew hopper top and a drain aperture located at a point centered equidistant from the edge of the closed brew hopper bottom; and
   a hydraulic siphon tube assembly having an inlet and an outlet, and affixed to the brew hopper, wherein the hydraulic siphon tube assembly traverses through an aperture in the cylindrical wall of the brew hopper proximate the top of open brew hopper top;
   the brew hopper and hydraulic siphon tube assembly configured to allow hot water to bloom and steep for a controlled amount of time in the brew hopper corresponding to the rate of time that a unit of hot water traverses from the inlet to the outlet of the hydraulic siphon tube assembly using a siphoning action.

5. The beverage brewing system of claim 4, further comprising:
   a thermal switch coupled to a heating element operable to cut off power to the heating element; and
   a solenoid operable to open a drain door located at the bottom of the brew hopper so as to allow liquid in the brew hopper to be dispensed into an auto-drip carafe.

* * * * *